(12) United States Patent
Koren et al.

(10) Patent No.: US 10,785,328 B2
(45) Date of Patent: Sep. 22, 2020

(54) EFFICIENT COLLABORATIONS IN GLOBAL ENTERPRISE ENVIRONMENT

(71) Applicant: INTERNATIONAL BUSINESS MACHINES CORPORATION, Armonk, NY (US)

(72) Inventors: Leonid Koren, Rehovot (IL); Noam Nussbaum, Nes Ziona (IL); Avi Ribchinsky, Ashdod (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 669 days.

(21) Appl. No.: 15/351,655

(22) Filed: Nov. 15, 2016

(65) Prior Publication Data

US 2018/0139292 A1    May 17, 2018

(51) Int. Cl.
*H04L 29/08*        (2006.01)
*H04L 12/58*        (2006.01)

(52) U.S. Cl.
CPC ............ *H04L 67/22* (2013.01); *H04L 51/043* (2013.01); *H04L 67/24* (2013.01); *H04L 51/04* (2013.01)

(58) Field of Classification Search
CPC ......... H04L 67/22; H04L 51/04; H04L 67/24; H04L 51/043
See application file for complete search history.

(56) References Cited

U.S. PATENT DOCUMENTS

| 8,392,234 | B2 | 3/2013 | Ma et al. | |
| 9,105,000 | B1 | 8/2015 | White et al. | |
| 2006/0168204 | A1* | 7/2006 | Appelman | H04L 51/14 709/224 |
| 2007/0143433 | A1* | 6/2007 | Daigle | H04L 67/24 709/207 |
| 2008/0086528 | A1* | 4/2008 | Garg | G06F 11/3495 709/204 |
| 2009/0193080 | A1 | 7/2009 | Toscano | |
| 2011/0302003 | A1 | 12/2011 | Shirish et al. | |
| 2012/0239462 | A1* | 9/2012 | Pursell | G07C 5/085 705/7.38 |
| 2015/0025943 | A1 | 1/2015 | Schmidt et al. | |
| 2017/0140041 | A1* | 5/2017 | Dotan-Cohen | G06Q 10/04 |
| 2018/0081496 | A1* | 3/2018 | Bhardwaj | G06F 3/0481 |

OTHER PUBLICATIONS

Travis Balinas, "Understanding Email Deliverability, Inbox Rates and Bounce Rates", Oct. 2016 (Year: 2016).*

(Continued)

*Primary Examiner* — Soe Hlaing
(74) *Attorney, Agent, or Firm* — Cantor Colburn LLP; L. Jeffrey Kelly

(57) ABSTRACT

In some examples, a system for tracking user activities can include logic to log a plurality of activities corresponding to a user. The logic can also separate the plurality of activities into online activities and offline activities and establish a characteristic corresponding to the offline activities of the user. Furthermore, the logic can generate a message based on the characteristic.

17 Claims, 5 Drawing Sheets

(56) References Cited

OTHER PUBLICATIONS

Govindarajan et al., MITSloan Management Review "Building an Effective Global Business Team" Magazine: Summer 2001, Jul. 15, 2001; retried from: URL: http://sloanreview.mit.edu/article/building-an-effective-global-business-team/; 4 pgs.

IBM "IBM Kenexa (SaaS) solutions designed to enable a smarter workforce" IBM U.S. Software Announcement; 214-068, dated Feb. 4, 2014; retrieved from: URL: http://www-01.ibm.com/common/ssi/cgi-bin/ssialias?infotype=an&subtype=ca&appname=gpateam&supplier=897&letternum=ENUS214-068; 25 pgs.

Mel et al. "The NIST Definition of Cloud Computing" National Institute of Standards and Technology, Special Publication 800-145; Sep. 2011; 7 pgs.

* cited by examiner

200

EFFICIENT COLLABORATIONS IN GLOBAL ENTERPRISE ENVIRONMENT

BACKGROUND

The present disclosure relates to user activities, and more specifically, but not exclusively, to tracking user activities to determine offline activities and online activities.

SUMMARY

According to an embodiment described herein, a system for tracking user activities can include logic to log a plurality of activities corresponding to a user and separate the plurality of activities into online activities and offline activities. The logic can also establish a characteristic corresponding to the offline activities of the user and generate a message based on the characteristic.

According to another embodiment, a method for tracking user activities includes logging a plurality of activities corresponding to a user and separating the plurality of activities into online activities and offline activities. The method also includes establishing a characteristic corresponding to the offline activities of the user and generating a message based on the characteristic.

According to another embodiment, a computer program product for tracking user activities can include a computer readable storage medium having program instructions embodied therewith, wherein the computer readable storage medium is not a transitory signal per se. The program instructions can be executable by a processor to cause the processor to log a plurality of activities corresponding to a user and separate the plurality of activities into online activities and offline activities. The program instructions can also cause the processor to establish a characteristic corresponding to the offline activities of the user and generate a message based on the characteristic.

BRIEF DESCRIPTION OF THE DRAWINGS

FIG. 4 depicts an illustrative cloud computing environment according to an embodiment described herein; and.

DETAILED DESCRIPTION

Many organizations include teams of software developers and other employees who operate in various time zones around the world. In some instances, the combination of operating in multiple time zones and working during a standard business day can result in inefficiencies that can delay projects. For example, a user request for input from other users in different time zones can result in one business day delay before receiving the input. In other examples, a user request can result in delays if multiple individuals work on a project in different time shifts. In some embodiments, aggregated delays can result in an inefficient software development environment.

The embodiments described herein include techniques for tracking user activities. In some examples, a system can log a plurality of activities corresponding to a user and separate the plurality of activities into online activities and offline activities. For example, activities, such as sending electronic mail, among others, can be separated based on whether the user or the recipient is offline. An offline activity, as referred to herein, can include any activity in which a user or a recipient corresponding to the activity is outside of a predetermined period of time. For example, sending an email outside of a predetermined time period can be considered an offline activity. Similarly, sending an email to a recipient that is outside of a predetermined time period can also be considered an offline activity. By contrast, an online activity, as referred to herein, can include any activity in which a user and a recipient are both within a predetermined period of time. In some examples, the predetermined period of time can be based on the time zones or the digitally active period of a day for the user transmitting information and a user receiving information. In some embodiments, the techniques described herein also include establishing a characteristic corresponding to the offline activities of the user and generating a message based on the characteristic. The characteristic can include an efficiency rating based on a number of offline activities that a user performs, which is described in greater detail below in relation to FIG. 2.

Figure 1:
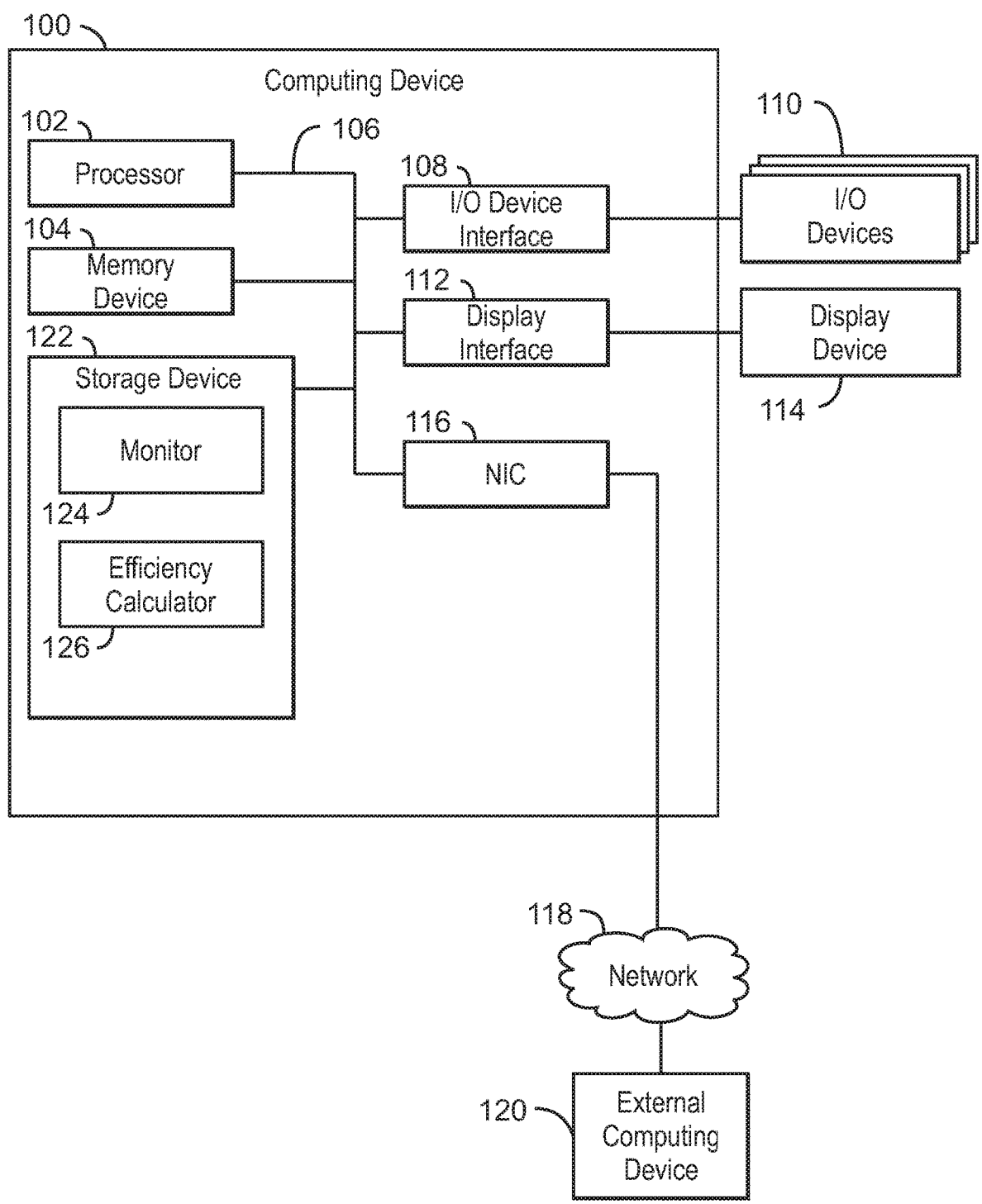
FIG. 1 depicts a block diagram of an example computing system that can track user activities according to an embodiment described herein.

With reference now to FIG. 1, an example computing device is depicted that can track user activities. The computing device 100 may be, for example, a server, desktop computer, laptop computer, tablet computer, or smartphone. In some examples, computing device 100 may be a cloud computing node. Computing device 100 may be described in the general context of computer system-executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the Internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a monitor 124 to a log a plurality of activities corresponding to a user. The activities can include transmitting messages, logging into applications such as instant message applications, accessing electronic mail accounts, and the like. In some embodiments, the monitor 124 can separate the plurality of activities into online activities and offline activities. For example, the monitor 124 can separate the plurality of activities based on a predetermined time period. In some examples, the predetermined time period can correspond to business hours for a development team, among other periods of time. In some embodiments, an efficiency calculator 126 can establish a characteristic, such as an efficiency rating, which corresponds to the offline activities of the user. The efficiency calculator 126 can also generate a message based on the characteristic. In some examples, the message can include information regarding a number of offline activities performed by a user or initiated by a user.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the monitor 124 and efficiency calculator 126 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the monitor 124 and efficiency calculator 126 can be implemented with logic, wherein the logic, as referred to herein, can include any suitable hardware (e.g., a processor, among others), software (e.g., an application, among others), firmware, or any suitable combination of hardware, software, and firmware.

Figure 2:
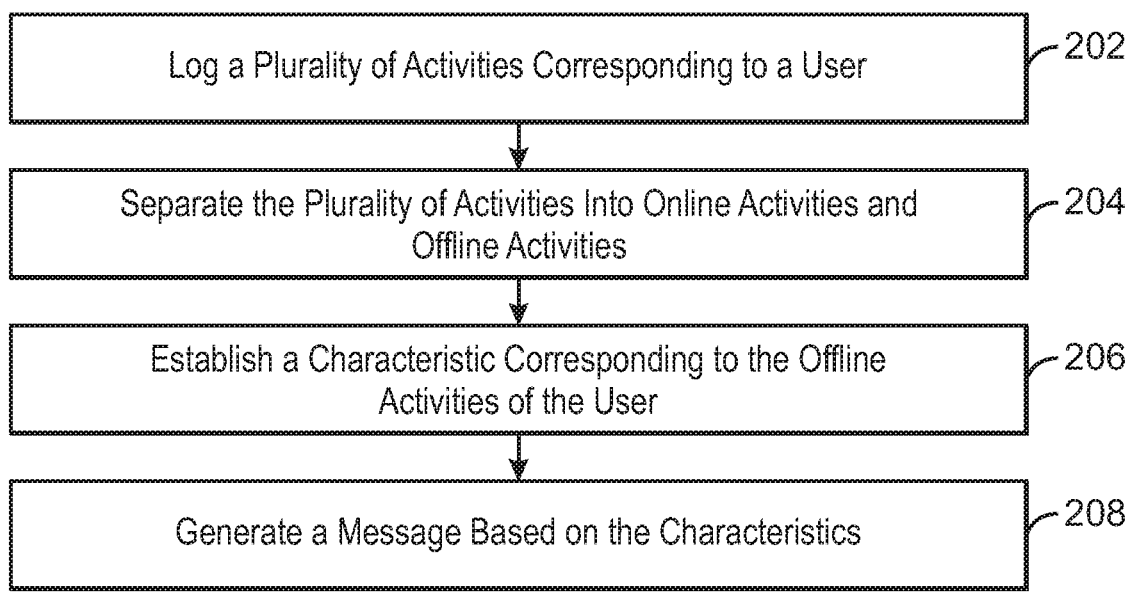
FIG. 2 is a process flow diagram of an example method that can track user activities according to an embodiment described herein.

FIG. 2 is a process flow diagram of an example method that can track user activities. The method 200 can be implemented with any suitable computing device, such as the computing device 100 of FIG. 1.

At block 202, a monitor 124 can log a plurality of activities corresponding to a user. In some embodiments, the activities can include accessing electronic mail, accessing a social media network, accessing a calendar application, answering at least one telephone call, performing task management and tracking activities, providing a user presence on an application, and the like. In some examples, the activities can be logged or monitored for any suitable period of time. For example, a user's activities may be logged continuously for hours, days, months, or any other suitable period of time. In some embodiments, a user's activities can be logged or monitored using non-continuous techniques such as monitoring a user's activities during certain hours of a day or during certain days of a week and extrapolating the activities. For example, the monitor 124 may monitor a user for a predetermined number of days a week, which is less than the number of days in a work week. The monitor 124 can then extrapolate the logged activities during the monitored days using any suitable mathematical technique to represent a number of activities that would be performed during an entire work week.

At block 204, the monitor 124 can separate the plurality of activities into online activities and offline activities. In some embodiments, the offline activities can correspond to a user performing the activities or a recipient of information generated from the activities. In some embodiments, the monitor 124 can create a digital activity profile for the user being monitored based on a time stamp corresponding to each of the plurality of activities and aggregate the time stamps to determine the online activities and the offline activities of the user based on a predetermined time period. The predetermined period of time can correspond to a time of day for a user or a recipient based on the time zone of the user initiating an activity or the user receiving information based on the activity. In some embodiments, the monitor 124 can determine the offline activities for the user by monitoring each sent message from the user, and determine if the recipient of each sent message is offline. In some embodiments, the efficiency calculator 126 can determine if a user is offline based on an away message from an electronic mail reply or messenger reply, a time of day for the recipient, or a predetermined time period, among others. In some examples, the monitor 124 can calculate a time for the recipient based on a time zone corresponding to the recipient and any suitable adjustment due to daylight savings. In some embodiments, the monitor 124 can access a service to determine if a recipient's presence indicates an active status when a message is transmitted from a user to the recipient. In some embodiments, a user who initiates an activity outside of a predetermined period of time can be considered to initiate an offline activity. For example, the monitor 124 can determine that a user who sends an email outside of standard business hours is performing an offline activity.

At block 206, an efficiency calculator 126 can establish a characteristic corresponding to the offline activities of the user. For example, the characteristic can include a calculated efficiency rating of the user based on a division of a total number of messages transmitted by the user by a number of messages transmitted by the user to offline recipients. In some embodiments, the efficiency calculator 126 can generate a total counter corresponding to a total number of messages transmitted by a user and an offline activity counter corresponding to a number of the messages transmitted to a user that is offline. In some examples, the efficiency calculator can calculate the efficiency rating based on a configurable period of time. For example, the efficiency calculator can be determined based on monitoring activities performed or initiated by a user during a period of hours, days, weeks, or months, among others.

At block 208, the efficiency calculator 126 can generate a message based on the characteristic. For example, the message can indicate an average percentage of offline activities performed or initiated by a user during an hour, day, week, month, or any other period of time. In some embodiments, the efficiency calculator 126 can determine a team efficiency rating based on an average of a plurality of efficiency ratings for a set of users. In some examples, the efficiency calculator can generate the message when the characteristic corresponding to the efficiency rating exceeds a threshold. For example, the threshold can indicate a percentage of total activities or messages transmitted by a user to an offline user or during a period of time when a user is considered to be offline. In some embodiments, the message can indicate the configurable period of time used for monitoring activities between various users.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the efficiency calculator 126 can also modify an application based on the characteristic to enable efficient communications between users who are digitally active during different times of a day. In some examples, the efficiency calculator 126 can modify an out of office setting of an email application in response to detecting a time of day that corresponds to offline activities for a user.

In some embodiments, the efficiency calculator 126 can detect that a user attempts to transmit messages to a set of users during their offline hours. The efficiency calculator 126 can generate a warning to provide to the user each day indicating the offline period of time for the set of users who are frequently contacted is about to begin. The warning can be configurable to enable a user to transmit any suitable number of messages prior to the offline period of time beginning for frequent recipients of messages. In some embodiments, an application can be modified to provide the warning to the user and request acknowledgment of the warning before enabling the detection of additional user input. In some embodiments, the efficiency calculator 126 can monitor topics corresponding to tasks performed by any number of users and provide alternative users who are not offline when a message is to be transmitted. For example, the monitor 124 may detect a message corresponding to a database topic and determine that a database user is active during a period of time that frequent recipients are offline. In some examples, the efficiency calculator 126 can generate a modified time period for a user and a set of recipients and provide the modified period of time to the user and set of recipients as a proposed period of time for transmitted messages. For example, a calendar application can be modified to add time notifications corresponding to the modified period of time. In some embodiments, a monitor 124 can detect a time of day corresponding to a first accessed file stored on a server, or information stored in a database, among others, and the monitor 124 can determine an online period of time corresponds to the file or information access. In some embodiments, the efficiency calculator 126 can also generate a graph depicting the efficiency rating of a user over any suitable period of time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
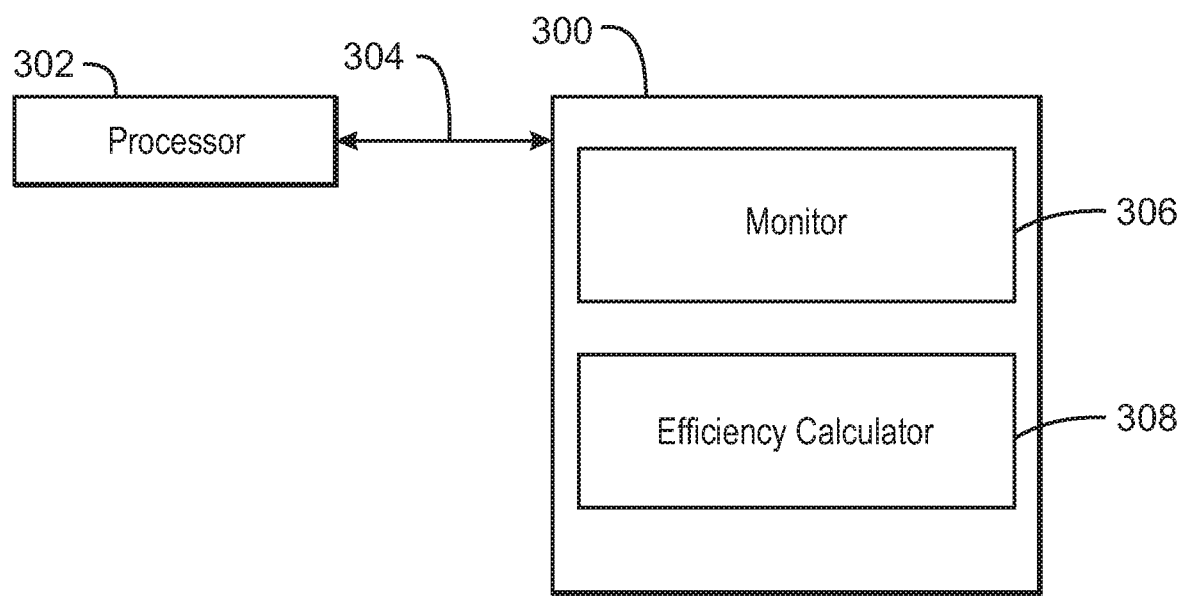
FIG. 3 is a tangible, non-transitory computer-readable medium that can track user activities according to an embodiment described herein.

Referring now to FIG. 3, a block diagram is depicted of an example of a tangible, non-transitory computer-readable medium that can track user activities. The tangible, non-transitory, computer-readable medium 300 may be accessed by a processor 302 over a computer interconnect 304. Furthermore, the tangible, non-transitory, computer-readable medium 300 may include code to direct the processor 302 to perform the operations of the current method. For example, a monitor 306 can log a plurality of activities corresponding to a user and separate the plurality of activities into online activities and offline activities. In some embodiments, an efficiency calculator 308 can establish a characteristic corresponding to the offline activities of the user, and generate a message based on the characteristic.

It is to be understood that any number of additional software components not shown in FIG. 3 may be included in the tangible, non-transitory, computer-readable medium 300, depending on the specific application. Furthermore, fewer software components than those shown in FIG. 3 can be included in the tangible, non-transitory, computer-readable medium 300.

Figure 4:
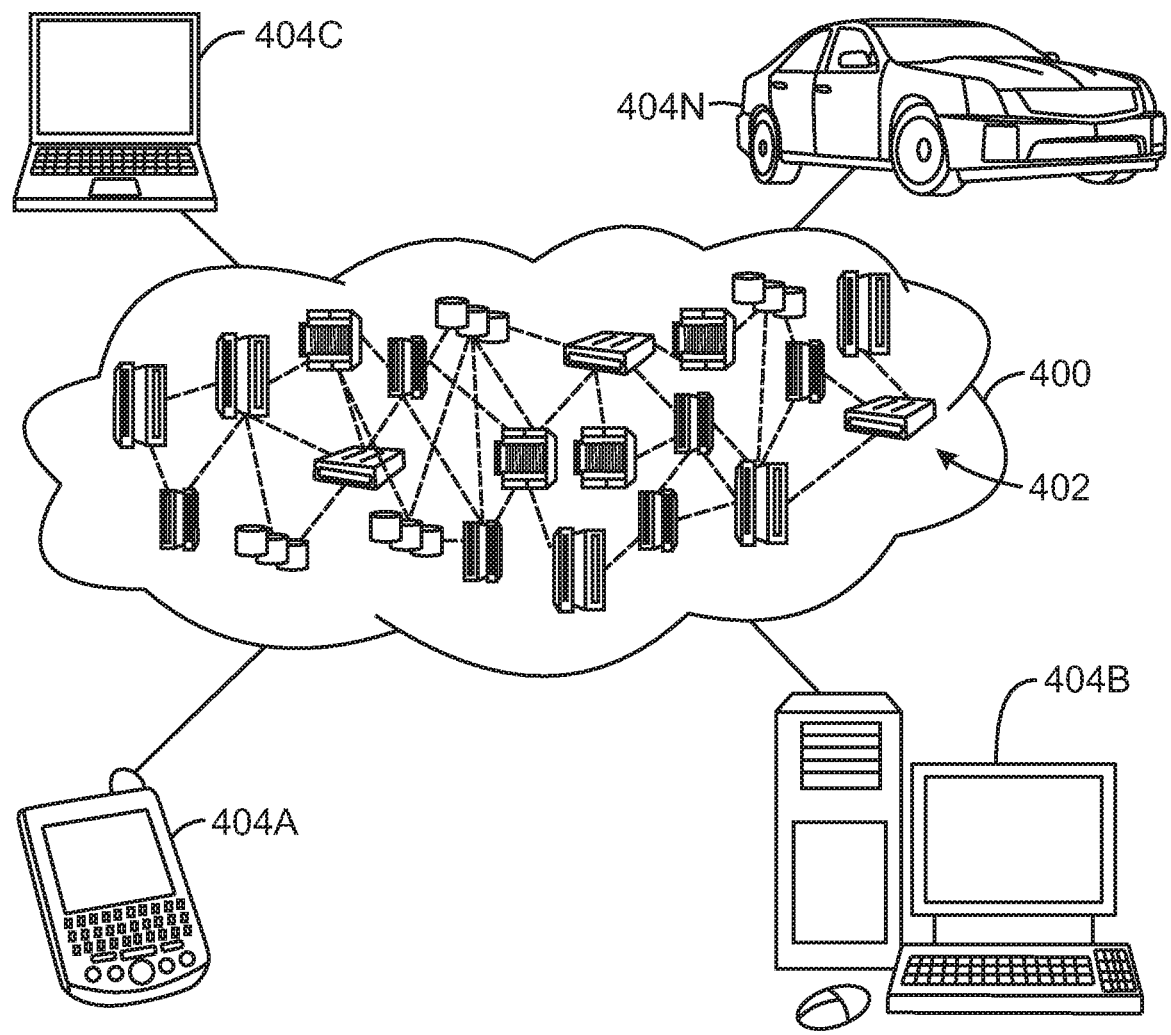

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
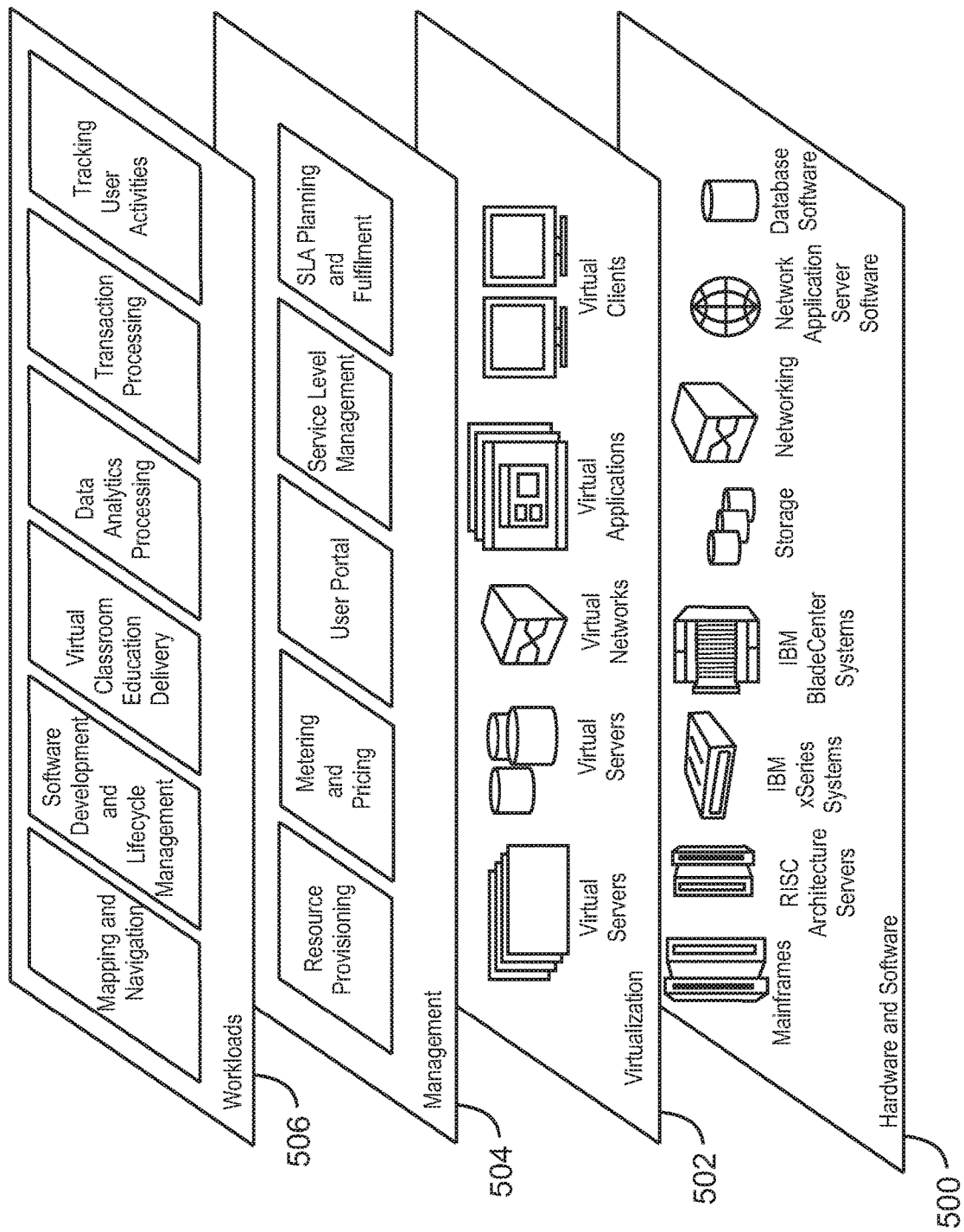
FIG. 5 depicts a set of functional abstraction layers provided by a cloud computing environment according to an embodiment described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and tracking user activities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A cloud computing node of a distributed cloud computing system for tracking user activities, the cloud computing node comprising a processor and a memory defining a monitor and an efficiency calculator implemented in hardware to cause the processor to:
continuously log, at the monitor, a plurality of activities performed, by multiple users, at a plurality of corresponding user computing devices located at different time zones;
separate, at the monitor, the plurality of activities performed by each of the multiple users into online activities and offline activities;
establish, at the efficiency calculator, a characteristic corresponding to the offline activities of each of the multiple users, wherein the established characteristic comprises an efficiency rating of each of the multiple users that is calculated by the efficiency calculator of the processor and wherein the efficiency rating for one of the multiple users is calculated by the efficiency calculator based on a division of a total number of messages transmitted by the one of the multiple users by a number of messages transmitted by the one of the multiple users to recipients who are others of the multiple users who are offline at a time of the transmission; and
generate, at the efficiency calculator, first and second warnings to be issued to the one of the multiple users, wherein:
the first warning is responsive to a determination that the established characteristic exceeds a predefined threshold, and
the second warning is indicative of an offline period of a set of the others of the multiple users being about to begin and configurable to enable a transmission of messages by the one of the multiple users to users in the set prior to the offline period beginning.

2. The cloud computing node of claim 1, wherein the activities comprise accessing electronic mail.

3. The cloud computing node of claim 1, wherein the activities comprise accessing a social media network.

4. The cloud computing node of claim 1, wherein the activities comprise accessing a calendar application.

5. The cloud computing node of claim 1, wherein the activities comprise answering at least one telephone call.

6. The cloud computing node of claim 1, wherein the activities comprise performing task management and tracking activities.

7. The cloud computing node of claim 1, wherein the activities comprise providing a user presence on an application.

8. The cloud computing node of claim 1, wherein the processor is to: create a digital activity profile for each of the multiple users based on a time stamp corresponding to each of the plurality of activities; and aggregate the time stamps to determine the online activities and the offline activities of each of the multiple users based on a predetermined time period.

9. The cloud computing node of claim 1, wherein the plurality of activities comprises accessing electronic mail, accessing a social media network, accessing a calendar application, answering at least one telephone call, performing task management and tracking activities and providing a user presence on an application and the efficiency calculator is configured to:
determine the offline activities for each of the multiple users by monitoring each sent message from each of the multiple users; and
determine if a recipient of each sent message is offline.

10. The cloud computing node of claim 1, wherein the processor is to calculate the efficiency rating based on a configurable period of time.

11. The cloud computing node of claim 10, wherein the processor is to determine a team efficiency rating based on an average of a plurality of efficiency ratings for of the multiple users.

12. A method for tracking user activities by a cloud computing node of a distributed cloud computing system comprising a processor and a memory defining a monitor and an efficiency calculator implemented in hardware to cause the processor to execute the method, the method comprising:
continuously logging, at the monitor, a plurality of activities performed, by multiple users, at a plurality of corresponding user computing devices located at different time zones;
separating, at the monitor, the plurality of activities performed by each of the multiple users into online activities and offline activities;
establishing, at the efficiency calculator, a characteristic corresponding to the offline activities of each of the multiple users, wherein the established characteristic comprises an efficiency rating of each of the multiple users that is calculated by the efficiency calculator of the processor and wherein the efficiency rating for one of the multiple users is calculated by the efficiency calculator based on a division of a total number of messages transmitted by the one of the multiple users by a number of messages transmitted by the one of the multiple users to recipients who are others of the multiple users who are offline at a time of the transmission; and generating, at the efficiency calculator, first and second warnings to be issued to the one of the multiple users, wherein:

the first warning is responsive to a determination that the established characteristic exceeds a predefined threshold, and the second warning is indicative of an offline period of a set of the others of the multiple users being about to begin and configurable to enable a transmission of messages by the one of the multiple users to users in the set prior to the offline period beginning.

13. The method of claim 12, comprising:

creating a digital activity profile for each of the multiple users based on a time stamp corresponding to each of the plurality of activities; and aggregating the time stamps to determine the online activities and the offline activities of each of the multiple users based on a predetermined time period.

14. The method of claim 12, wherein the plurality of activities comprises accessing electronic mail, accessing a social media network, accessing a calendar application, answering at least one telephone call, performing task management and tracking activities and providing a user presence on an application, and wherein the method comprise:

determining the offline activities for each of the multiple users by monitoring each sent message from each of the multiple users; and determining if a recipient of each sent message is offline.

15. A computer program product for tracking user activities, the computer program product comprising computer readable storage medium having program instructions embodied therewith to define a monitor and an efficiency calculator that are implemented in hardware of a cloud computing node of a distributed cloud computing system, wherein the computer readable storage medium is not a transitory signal per se, the program instructions executable by a processor to cause the processor to:

continuously log, at the monitor, a plurality of activities performed, by multiple users, at a plurality of corresponding user computing devices located at different time zones;

separate, at the monitor, the plurality of activities performed by each of the multiple users into online activities and offline activities;

establish, at the efficiency calculator, a characteristic corresponding to the offline activities of each of the multiple users, wherein the established characteristic comprises an efficiency rating of each of the multiple users that is calculated by the efficiency calculator of the processor and wherein the efficiency rating for one of the multiple users is calculated by the efficiency calculator of the processor based on a division of a total number of messages transmitted by the one of the multiple users by a number of messages transmitted by the one of the multiple users to recipients who are others of the multiple users who are offline at a time of the transmission; and generate, at the efficiency calculator, first and second warnings to be issued to the one of the multiple users, wherein:

the first warning is responsive to a determination that the established characteristic exceeds a predefined threshold, and the second warning is indicative of an offline period of a set of the others of the multiple users being about to begin and configurable to enable a transmission of messages by the one of the multiple users to users in the set prior to the offline period beginning.

16. The computer program product of claim 15, wherein the program instructions cause the processor to:

create a digital activity profile for each of the multiple users based on a time stamp corresponding to each of the plurality of activities; and aggregate the time stamps to determine the online activities and the offline activities of each of the multiple users based on a predetermined time period.

17. The computer program product of claim 15, wherein the plurality of activities comprises accessing electronic mail, accessing a social media network, accessing a calendar application, answering at least one telephone call, performing task management and tracking activities and providing a user presence on an application, and wherein the method comprises and the program instructions cause the processor to:

determine the offline activities for each of the multiple users by monitoring each sent message from each of the multiple users; and determine if a recipient of each sent message is offline.

* * * * *